United States Patent Office

3,303,241
Patented Feb. 7, 1967

3,303,241
POLYVINYL CHLORIDE ADHESIVES CONTAINING POLYALLYL ESTER PLASTICIZERS
Thomas Courtney Moorshead, London, and Peter Paul Hopf, Orpington, England, assignors to A. Boake, Roberts and Company Limited, Stratford, London, England, a corporation of England
No Drawing. Filed June 2, 1964, Ser. No. 372,074
Claims priority, application Great Britain, June 11, 1963, 23,283/63
10 Claims. (Cl. 260—884)

The present invention relates to certain vinyl chloride polymer compositions having adhesive properties, such compositions comprising a major proportion as the vinyl chloride polymer. The term "vinyl chloride polymer" is used herein to define a homopolymer of vinyl chloride or a co-polymer of vinyl chloride prepared from monomers which comprise not more than 20% by weight of the total as monomers other than vinyl chloride.

It has been proposed to use vinyl chloride polymers as adhesive compositions for a variety of substrates, but hitherto such compositions have been very specialised in that the substrates to which each has been successfully applied are limited. Such adhesive compositions have usually included expensive chemicals which may often be difficult to obtain on a commercial scale. However, we have now found that the incorporation of certain allyl glycol mixed esters into a vinyl chloride polymer composition has the effect of rendering these compositions remarkably adhesive to a variety of substrates. The allyl esters for incorporation in the polymeric materials are themselves readily available and the compositions of the invention thus offer adhesives which are in many cases commercially and practically more attractive than the specialist adhesives containing vinyl chloride polymers hitherto proposed.

Accordingly, the invention provides a method for applying an adhesive vinyl chloride polymer composition to a substrate, which method comprises: mixing together a vinyl chloride polymer, from 5 to 70 parts by weight, per 100 parts of the vinyl chloride polymer present, of a poly-allyl ester of a mono-glycol bis-(polycarboxylate) ester acid of the general formula $HO_2CRCO \cdot OZO \cdot OCRCO_2H$ wherein R is the residue of an internal anhydride of a saturated aliphatic or a monobenzenoid di- or tri-carboxylic acid having the formula

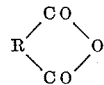

and Z is the residue of a glycol having the formula HOZOH wherein the hydroxyl groups are separated by a chain having from 2–6 atoms; applying the mixture to a substrate and curing it.

From a further aspect the invention provides an adhesive composition for use in the method of the invention, which composition comprises a vinyl chloride polymer, from 5 to 70 parts by weight, per 100 parts of the vinyl chloride polymer present, of the said poly-allyl ester and from 0.1 to 5 parts by weight, per 100 parts of the vinyl chloride polymer present, of an initiator compound which yields free radicals on heating to above its decomposition temperature.

The invention also provides plastic-coated substrates, the plastic coating of which has been applied by the method of the invention.

The said poly-allyl esters of mono-glycol bis-(polycarboxylate) ester acids of the general formula are best obtained by a process in which an ester acid of the formula

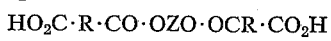

is reacted with allyl chloride in the presence of a tertiary amine in an amount at least equal to the amount of allyl chloride theoretically consumed during the reaction. The ester acid is itself obtained by the non-catalytic reaction between 2 molecular proportions of an internal anhydride of a saturated aliphatic, or a monobenzenoid di- or tri-carboxylic acid having the formula

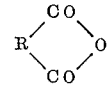

with substantially 1 mole of a glycol of the formula HO·Z·OH.

For present purposes we have found that the glycol employed must be a glycol in which the hydroxyl groups are separated by a chain of from 2 to 6 atoms. Preferably, the hydroxyl groups are primary and separated by an unbranched chain. For instance, there may be employed alpha-omega alkylene glycols such as ethylene, trimethylene, 1,4-butylene and 1,6-hexylene glycols, but more preferred is the use of diethylene glycol which appears to possess the optimum characteristics of viscosity and compatibility for inclusion of the said poly-allyl esters derived therefrom in vinyl chloride compositions. Monoethylene glycol is less preferred since the low viscosity of the poly-allyl esters prepared therefrom inhibits their incorporation into vinyl chloride polymers, and allyl esters prepared from ester acids wherein HOZOH represents a glycol of more than 6 atoms interposed between the hydroxyl groups do not appear to be readily compatible with vinyl chloride polymers.

The said internal anhydride is one having a 5- or 6-membered anhydride ring system, preferably the former. If the anhydride is derived from a tri-carboxylic acid it will, of course, have a free carboxyl group, the other two carboxyl groups being combined in the anhydride ring system. In the poly-allyl ester for present use this free carboxyl group may remain as such or may be esterified, usually with a further allyl group. As saturated aliphatic anhydrides that may be conveniently employed to prepare the required poly-allyl esters, there may be mentioned succinic and glutaric anhydrides and alkyl-substituted derivatives of such anhydrides; succinic anhydride being the preferred aliphatic anhydride. As monobenzenoid anhydrides, phthalic, trimellitic and hemimellitic anhydrides are referred, though alternatively there may be employed other substituted phthalic anhydrides, for example one containing a nuclear alkyl, halogen and/or nitro substituent.

Thus the preferred poly-allyl esters for present use are di-allyl diethylene glycol bis-phthalates; tetra-allyl diethylene glycol bis-trimellitate; di-allyl diethylene glycol bis-succinate; and di-allyl 1,4-butylene glycol bis-phthalate.

The vinyl chloride polymer is normally a homopolymer of vinyl chloride, but it may be a copolymer thereof prepared from one or more other monomers in a total amount not greater than 20% of the total polymerisable monomers. Such other monomers may be vinylidene chloride, vinylidene fluoride, vinyl acetate, styrene, methyl methacrylate and/or acrylonitrile.

The method of applying the adhesive composition comprises mixing a vinyl chloride polymer with from 5 to 70 parts by weight, per 100 parts of the vinyl chloride polymer present, of the allyl ester, applying the mixture to a substrate and curing it to obtain an adherent coating. The amount of allyl ester employed may vary over a broad range and depends on the nature of the adhesive composition desired. However, we have found that the use of amounts of the poly-allyl ester varying from 10 to 50 parts by weight, per 100 parts of the vinyl chloride polymer, provide satisfactory adhesive compositions for general use.

The methods by which the ingredients of the adhesive composition are mixed and applied to the substrate may be any of those conventionally employed.

The curing of the adhesive composition may be achieved by subjecting the coated substrate to, for example, ultra-violet light or ionising radiation. However, these methods are often cumbersome and uneconomic and it is, therefore, preferred to effect the curing of the adhesive by the incorporation of an initiator compound into the composition and heating the composition to above the decomposition temperature of the initiator compound.

The initiator which may be incorporated is a compound that yields free radicals on heating. The use of such initiators is known for inducing radical-addition polymerisation and many are commercially available and their operating temperatures described in the literature, which temperatures are usually in the range 50 to 250° C. Preferred initiators for present purposes are dibenzoyl peroxide, dilauroyl peroxide, tertiary-butyl perbenzoate, tertiary butyl peracetate, dicumyl peroxide, di-tertiary butyl peroxide, cumyl hydroperoxide, di-benzal diperoxide, 2,2-bis-(tertiary butyl peroxy) butane and azo-bis-isobutyronitrile. If the compositions containing the initiator are to be marketed as such for subsequent use, care should be taken during the working of the composition, for example by milling together the components thereof, not to bring about any appreciable polymerisation of the poly-allyl esters by, for example, heating the composition above the decomposition temperature of the initiator employed. However, if it is envisaged that the adhesive compositions will be stored for prolonged periods before use, it is often preferable to add the requisite amount of initiator to the composition shortly prior to use.

The adhesive compositions may contain other ingredients normally present in such compositions, such as heat stabilisers, plasticisers fillers and pigments. We have found that the choice of heat stabiliser is to some extent governed by the substrate to which the adhesive is to be applied as well as by the adhesive composition. Thus a change in the heat stabiliser used in any particular composition may adversely affect the adhesive properties. Suitable heat stabilisers for general use include: the organotin compounds particularly for use on nylon substrates; and, more preferably, lead compounds, such as white lead, lead sulphate, lead phthalate, lead phosphate, lead acetate, lead stearate and lead silicate. Liquid cadmium/barium stabilisers and epoxidised oils also find use on nylon substrates. The amount of stabiliser employed may vary between 2 and 15 parts by weight per 100 parts of vinyl chloride polymer, the use of 5 to 10 parts being preferred.

The vinyl chloride polymer and the allyl esters form the major part of the adhesive compositions of the invention. However, in addition to those there may also be present plasticisers to render the composition more flexible on curing or easier to work prior to curing. The amount of plasticiser commonly employed for vinyl chloride polymers ranges from 30 to 80 parts by weight of plasticiser for each 100 parts of polymer. We have found that these amounts may be satisfactorily incorporated in the adhesive composition of the invention, amounts of from 30 to 50 parts by weight of plasticiser per 100 parts of polymer being preferred. The plasticiser employed may be any of those conventionally used with vinyl chloride polymers, including the phthalate plasticisers, for example that known as "Phthalate 79," which is a mixed alkyl phthalate ester wherein the alkyl groups contain between 7 to 9 carbon atoms, di-iso-octyl phthalate, di-2-ethylhexyl phthalate. The use of "Phthalate 79" is preferred.

The compositions may also contain fillers, such as precipitated calcium carbonate, blanc fixé, or commonly used silicate fillers. A purpose of these fillers is to vary the viscosity of the adhesive compositions to obtain the desired viscosity for each application. An equally important property of the filler is that it assists adhesion of the top-coat to the adhesive layer. The amount of filler employed may therefore vary within very broad limits.

The form in which the adhesive compositions are prepared varies with their intended mode of application, and may be as a plastisol, i.e. a paste, as a powder or as an organosol. It is usual to prepare the adhesive compositions in the form of plastisols, in which case it is preferred to use a paste forming vinyl chloride polymer, such as that sold under the trade name of Breon 121. However, the compositions may also be made up in powder form using a suspension polymerised vinyl chloride polymer, such as that sold under the trade name of CORVIC D55/9; or as liquid compositions wherein the adhesive composition is dispersed in a volatile liquid carrying medium such as benzene, toluene, xylene or white spirit.

The substrate may be, for example a metal; a thermoplastic polymer, such as nylon, a polyethylene terephthalate polyester or PVC itself; a cellulosic material such as cotton; wood; or glass. Preferably the surface of the substrate is clean, though if it is a metal surface, this may possess a phosphate or other anti-corrosive coating. The degree of adhesion obtained by the present invention between the polymer and a metal substrate is greatest when the substrate is a ferrous metal, particularly steel or a stainless steel alloy. The substrate may also be a non-ferrous metal, for example copper, tin, brass, zinc and aluminium, though in general the adhesion may not be quite as great as that obtained with ferrous metals.

The adhesive compositions of the invention find especial use when the substrate is nylon, particularly a woven nylon fabric. They may be used to provide the sole vinyl chloride polymer coating to the nylon, or as an adhesive for the more conventionally used PVC top-coats applied as a callendered film laminate or by using standard plastisol spreading techniques.

The polymer composition is usually applied to the substrate so as to provide a coating of thickness between 0.0254 mm. and 6.35 mm. Thus, there may be obtained according to the invention plastic-coated metals, particularly steel strip or sheet, which may thereafter be formed or cut by conventional methods. Such plastic-coated metals find use, for example, in car body trim and other vehicle accessories where the polymer provides an anti-corrosive coating to the metal. The plastic coating may also find use as an electrical insulator, for example in the production of plastic-coated wire for electrical connections.

The application of the adhesives of the invention to nylon substrates finds use in the fabrication of such products as collapsible containers for liquids, waterproof sheeting, multi-ply nylon reinforced belting and in heavy-duty upholstery.

The invention will now be illustrated by the following examples in which all parts are expressed on a weight basis.

Two tests were used to evaluate the adhesive properties of various compositions. These were (i) shear adhesion test for metal substrates and (ii) peel test for nylon substrates.

In the shear adhesion test two mild steel strips, each 1" x 4" x 0.35", were overlapped to give an overlapped area of one square inch. The overlapped area was coated with the adhesive composition and the two strips pressed together and cured, giving an adhesive layer of known thickness. After ageing for at least 12 hours at 21 to 23° C., the test pieces were placed in the jaws of a Tensometer and the failure load determined at a jaw separation rate of 1 inch per minute.

In the peel test the adhesive composition was applied to a closely woven filter cloth grade of nylon fabric, weighing 12½ oz. per square yard, thus ensuring that the effect of mechanical keying of the PVC to the nylon weave was kept to a minimum.

The test sample was prepared by coating a strip of the fabric with adhesive to give the minimum coating weight possible with this grade of nylon (5–5½ oz. per square yard). The adhesive coating was subjected to pregelling for 1 min. at 100° C. and then a sandwich of two layers of the treated nylon separated by a layer of 0.025" callendered PVC in contact with the treated faces of the nylon was prepared. This sandwich layer was then heated at 160° C. for 6 minutes under a pressure of approximately 60 lb./in.$^2$ in a metal frame. After ageing for 48 hours the sample was tested by cutting a strip 1" wide through the top nylon layer and the PVC sheet, and determining the force required to peel the PVC from the lower nylon layer.

EXAMPLE 1

A powdered composition was prepared by blending together the following components at 75° to 80° C. for 30 to 60 minutes:

| | Parts |
|---|---|
| Vinyl chloride polymer (as sold under the trade name CORVIC D 55/9) | 100 |
| Di-octyl phthalate | 40 |
| Di-allyl diethylene glycol bis-phthalate | 30 |
| Basic lead carbonate | 10 |
| Tertiary butyl perbenzoate | 1 |

This composition was spread on the mild steel test strips and cured to give an adhesive thickness of 0.005 inch. The shear strength of the adhesive was of the order of 1,300 lbs. per square inch.

EXAMPLE 2

A PVC composition was prepared in the form of a free flowing paste by milling the following ingredients together on a triple roll mill at a temperature of about 80° C.:

| | Parts |
|---|---|
| A paste forming vinyl chloride polymer (sold under the trade name of Breon 121) | 100 |
| Di-octyl phthalate | 40 |
| Di-allyl diethylene glycol bis-phthalate | 30 |
| Basic lead carbonate | 10 |
| Tertiary butyl perbenzoate | 0.5 |

This paste was applied to two of the mild steel strips and cured to give an adhesive thickness of 0.005 inch. The shear strength of the adhesive was of the order of 1,300 lbs. per square inch.

EXAMPLE 3

A PVC composition was prepared by milling together the following ingredients at a temperature of 80° C.:

| | Parts |
|---|---|
| Paste forming vinyl chloride polymer (sold under the trade name of Breon 121) | 100 |
| Phthalate 79 | 50 |
| Di-allyl diethylene glycol bis-trimellitate | 20 |
| Basic lead carbonate | 8 |
| Tertiary butyl perbenzoate | 0.4 |

This paste was applied to the nylon fabric for the peel strength test. The force required to peel the PVC from the lower nylon layer was 15.5 lbs. per inch width.

EXAMPLE 4

The compositions were made up as in Example 3 using 20 parts of allyl ester (formulation A) and 10 parts of allyl ester (formulation B) with varying amounts of tertiary butyl perbenzoate. The various peel strengths obtained are set out in the following table:

| Tertiary butyl perbenzoate | Peel strength (lb./inch width) | |
|---|---|---|
| | A | B |
| 0.4 | 15.5 | 14 |
| 0.8 | 24 | 32 |
| 1.6 | 35 | 45 |

EXAMPLE 5

In formulation A the tertiary butyl perbenzoate was replaced with 0.8 part by weight of dicumyl peroxide. The peel strength of the adhesive was found to be 24 lbs./inch width.

*Comparative experiment*

By way of comparison with the above formulations the peel strength of a composition made by mixing the following ingredients was determined:

| | Parts |
|---|---|
| Paste forming vinyl chloride polymer (sold under the trade name of Breon 121) | 100 |
| Phthalate 79 | 50 |
| Basic lead carbonate | 8 |
| Tertiary butyl perbenzoate | 0.4 |

The formulation was applied to the nylon fabric and cured. The peel strength was found to be 2 lbs./inch width, thus showing that the inclusion of the allyl ester in the adhesive compositions of the invention considerably enhances the adhesive strength of such compositions.

EXAMPLE 6

A PVC composition was prepared by milling together the following ingredients:

| | Parts |
|---|---|
| A paste forming vinyl chloride polymer | 100 |
| Tetra-allyl diethylene glycol bis-trimellitate | 20 |
| Phthalate 79 | 80 |
| Basic lead carbonate | 8 |
| Tertiary butyl perbenzoate | 0.8 |

This composition was then applied to a polyethylene terephthalate polyester fabric and the peel strength of the adhesive evaluated according to the test process set out above for nylon. The peel strength was found to be 8 lbs./inch width.

*Comparative experiment*

A composition was prepared and tested as in Example 6, the poly-allyl ester being omitted from the composition. The peel strength was found to be 3 lbs./inch width, thus demonstrating that the inclusion of the poly-allyl esters in the adhesive compositions of the invention considerably enhances the adhesive strength of such compositions.

What we claim is:

1. A method of obtaining a polymer-coated substrate, which method comprises: preparing a mixture consisting essentially of a vinyl chloride polymer and a poly-allyl ester of a mono-glycol bis-(polycarboxylate) ester acid of the general formula $HO_2CRCO \cdot OZO \cdot OCRCO_2H$ wherein R is the residue of an anhydride of the formula

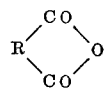

selected from the group consisting of saturated aliphatic dicarboxylic, saturated aliphatic tricarboxylic, monobenzenoid dicarboxylic, and monobenzenoid tricarboxylic anhydrides, and Z is the residue of a glycol of the general formula HOZOH wherein a chain having from 2 to 6 atoms separates the hydroxyl groups, said poly-allyl ester being present in an amount of from 5 to 70 parts by weight per 100 parts of the vinyl chloride polymer; applying the mixture to a substrate and curing said mixture thereon.

2. A method of obtaining a polymer coating on a ferrous metal substrate which method comprises: preparing a mixture consisting essentially of a vinyl chloride polymer and a poly-allyl ester of a mono-glycol bis-(polycarboxylate) ester acid of the general formula

wherein R is the residue of an anhydride of the formula

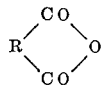

selected from the group consisting of saturated aliphatic dicarboxylic, saturated aliphatic tricarboxylic, monobenzenoid dicarboxylic, and monobenzenoid tricarboxylic anhydrides, and Z is the residue of a glycol of the general formula HOZOH wherein a chain having from 2 to 6 atoms separates the hydroxyl groups, said poly-allyl ester being present in an amount of from 5 to 70 parts by weight per 100 parts of the vinyl chloride polymer; applying the mixture to a ferrous metal substrate and curing said mixture thereon.

3. A method of obtaining a polymer coating on a nylon substrate, which method comprises: preparing a mixture consisting essentially of a vinyl chloride polymer and a poly-allyl ester of a mono-glycol bis-(polycarboxylate) ester acid of the general formula $$HO_2CRCO \cdot OZO \cdot OCRCO_2H$$

wherein R is the residue of an anhydride of the formula

selected from the group consisting of saturated aliphatic dicarboxylic, saturated aliphatic tricarboxylic, monobenzenoid dicarboxylic, and monobenzenoid tricarboxylic anhydrides, and Z is the residue of a glycol of the general formula HOZOH wherein a chain having from 2 to 6 atoms separates the hydroxyl groups, said poly-allyl ester being present in an amount of from 5 to 70 parts by weight per 100 parts of the vinyl chloride polymer; applying the mixture to a nylon substrate and curing the said mixture thereon.

4. An adhesive composition for application to a substrate which composition comprises: a vinyl chloride polymer, a poly-allyl ester of a mono-glycol bis-(polycarboxylate) ester acid of the general formula $$HO_2CRCO \cdot OZO \cdot OCRCO_2H$$

wherein R is the residue of an anhydride of the formula

selected from the group consisting of saturated aliphatic dicarboxylic, saturated aliphatic tricarboxylic, monobenzenoid dicarboxylic, and monobenzenoid tricarboxylic anhydrides, and Z is the residue of a glycol of the general formula HOZOH wherein a chain having from 2 to 6 atoms separates the hydroxyl groups, said poly-allyl ester being present in an amount of from 5 to 70 parts by weight per 100 parts of the vinyl chloride polymer.

5. An adhesive composition for application to a substrate which composition comprises: a vinyl chloride polymer, a poly-allyl ester of a mono-glycol bis-(polycarboxylate) ester acid of the general formula $$HO_2CRCO \cdot OZO \cdot OCRCO_2H$$

wherein R is the residue of an anhydride of the formula

selected from the group consisting of saturated aliphatic dicarboxylic, saturated aliphatic tricarboxylic, monobenzenoid dicarboxylic, and monobenzenoid tricarboxylic anhydrides, and Z is the residue of a glycol of the general formula HOZOH wherein a chain having from 2 to 6 atoms separates the hydroxyl groups, said poly-allyl ester being present in an amount of from 5 to 70 parts by weight per 100 parts of the vinyl chloride polymer and, as heat stabiliser for the vinyl chloride polymer, an inorganic stabiliser based on lead.

6. A composition as claimed in claim 5 wherein the glycol moiety is derived from diethylene glycol.

7. A composition as claimed in claim 5 wherein the allyl ester is di-allyl diethylene glycol bis-phthalate.

8. A comopsition as claimed in claim 5 wherein the allyl ester is tetra-allyl diethylene glycol bis-trimellitate.

9. A composition as claimed in claim 5 wherein the allyl ester is di-allyl diethylene glycol bis-succinate.

10. A composition as claimed in claim 5 wherein the allyl ester is di-allyl 1,4-butylene glycol bis-phthalate.

No references cited.

MURRAY TILLMAN, *Primary Examiner.*

J. T. GOOLKASIAN, *Assistant Examiner.*